United States Patent

[11] 3,607,415

[72] Inventors Joseph T. Kummer
 Riverview;
 Tseng Y. Tien, Ann Arbor, both of Mich.
[21] Appl. No. 877,348
[22] Filed Nov. 17, 1969
[45] Patented Sept. 21, 1971
[73] Assignee Ford Motor Company
 Dearborn, Mich.

[54] SOLID STATE ENERGY STORAGE DEVICE
 6 Claims, 1 Drawing Fig.
[52] U.S. Cl. .................................................. 136/83,
 136/153, 317/258
[51] Int. Cl. .................................................. H01m 21/00,
 H01g 1/00
[50] Field of Search .................................. 136/83, 86,
 6, 153, 143, 146, 155; 317/258

[56] References Cited
 UNITED STATES PATENTS
3,499,796 3/1970 Hever et al. .................. 136/83

Primary Examiner—Winston A. Douglas
Assistant Examiner—A. Skapars
Attorneys—John R. Faulkner and Glenn S. Arendsen ABSTRACT: A disc of sintered zirconium oxide and yttrium oxide is sandwiched between electronically and anionically conductive discs of cerium oxide. The intermediate disc consists of an electronically insulative structural lattice that contains oxygen anions capable of migrating in relationship to said lattice under the influence of an external electric field. At temperatures of about 500°–1500° C. and under the influence of such an electric field, oxygen anions travel from one side disc through the intermediate disc to the other side disc while the corresponding electrons travel through an external circuit.

3,607,415

SOLID STATE ENERGY STORAGE DEVICE

SUMMARY OF THE INVENTION

This application relates to U.S. Pat. application by Hever et al. Ser. No. 595,814, now U.S. Pat. No. 3,499,796 filed Nov. 21, 1966 and assigned to the assignee of this application. The entire disclosure of application Ser. No. 595,814 is incorporated herein by this reference.

The Hever et al. application provides a solid state energy storage device in which an electrical field produces cations in one side member that migrate through a cationically conductive but electronically insulative intermediate member to another side member. Electrons given up by the cations travel through an external circuit connected to the side members. When the electrical field is removed, the cations return to the original side member through the intermediate member while the electrons return to the original side member through the external circuit.

This invention provides a solid state energy storage device in which an electrical field produces anions in one side member that migrate through an electronically insulative intermediate member to the other side member. The device comprises a ceramic sandwich haVing two side members in anion exchange relationship with and separated by an intermediate member. Each of the side members consists essentially of a polycrystalline material comprising an electronically conductive structural lattice containing anions that migrate relative to the lattice. Ions of a metal in two valence states and ions of oxygen preferably make up the lattice. The intermediate member consists essentially of an electronically insulative structural lattice containing oxygen anions that migrate in relation to said lattice under the influence of an electric field.

Heating the device to a temperature of at least about 500° C. and applying an electrical field thereto moves oxygen anions from one side member to the other side member through the intermediate member. Good operations can be obtained at temperatures ranging up to about 1,500° C. although the device is most economical in the 500°–1,000° C. range. Electrons surrendered by the anions move through an external electrical circuit connecting the side members. When the field is removed, the anions return to the original side member through the intermediate member and the electrons return to the original side member through the external circuit, thereby producing an electrical current in the external circuit. Thus the device is capable of acting as a solid state capacitor or energy storage device.

BRIEF DESCRIPTION OF THE DRAWING

The drawing is a sectional view of a device of this invention showing the side and intermediate layers. Conductors are attached to the side layers for connection to an external circuit.

DETAILED DESCRIPTION

Figure 1:
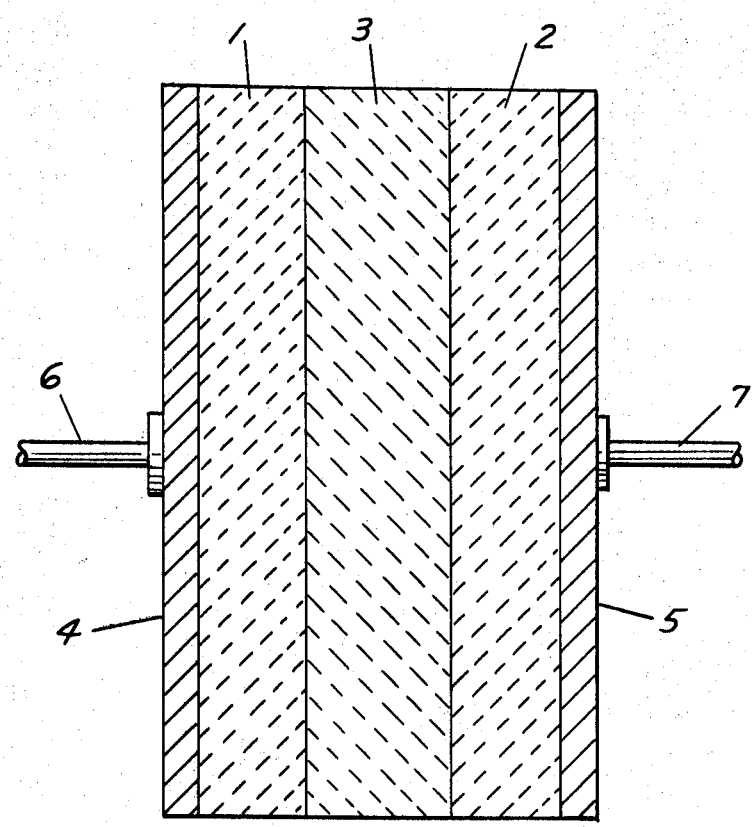

Referring to the drawing, side members 1 and 2 are electronically and anionically conductive materials. The side members typically are crystalline materials formed from a carefully selected sintered mixture of ceric oxide and cerous oxide. Mixture ingredients are selected to give a resulting cerium oxide composition having a molar ratio of oxygen to cerium numerically between the molar ratios of the elements in the two valence states of cerium. Good results are obtained with molar ratios between about 1.80 and 1.99 with best results being provided by a preferred range of 1.90 to 1.95.

An anionically conductive, electronically resistive ceramic member 3 is sandwiched between side members 1 and 2. Intermediate member 3 typically consists essentially of a solid solution of zirconium oxide and yttrium oxide or zirconium oxide and calcium oxide. The mixture generally contains about 80–95 mole percent zirconium oxide with the balance yttrium oxide or calcium oxide. Best results are obtained with about 88–92 mole percent zirconium oxide.

Members 1, 2 and 3 are assembled together and sintered in a hot pressing operation at about 1,300° C. The hot pressing operation typically is carried out above 5,000 p.s.i. and preferably is conducted at pressures of about 50 p.s.i. to 10,000 p.s.i. This compressing and sintering operation produces a good anion exchange relationship between each side member and the intermediate member.

Metal conductors 4 and 5 are attached electrically to the external surfaces of members 1 and 2. Useful conductors are platinum sheets or foils. Conductor leads 6 and 7 then are attached to conductors 4 and 5 and connected to an external electrical circuit (not shown).

When an electrical energy source included in the external circuit applies an electrical potential across conductors 4 and 5, electrons are pumped from the side member connected to the positive terminal of the energy source to the side member connected to the negative terminal. Oxygen anions pass from the side member connected to the negative terminal through the intermediate member to the other side member. Removing the electrical potential permits the flows to reverse and thus produces an electric current in the external circuit.

EXAMPLE

Powders of chemically pure zirconium oxide and yttrium oxide are mixed together thoroughly in acetone, dried and sintered at about 1,350° C. for 24 hours in a platinum container. The reaction product is ground, pressed into a disc at about 40,000 p.s.i. and sintered at 1,800°–2,000° C. in an inert atmosphere.

End members are prepared by mixing powdered ceric oxide and cerous oxide in proportions selected to provide an overall composition having a molar ratio of oxygen to cerium between 1.90 and 1.95. After thorough mixing, the powders are pressed at about 40,000 p.s.i. into discs and sintered at 1,800°–2,000° C. in an inert atmosphere.

Two of the cerium oxide discs are placed on opposite sides of the zirconium oxide-yttrium oxide disc and a sheet of 0.0005 inch thick platinum foil is placed on each exterior surface of the cerium oxide discs. The resulting sandwich is hot pressed at 1,300° C. and 5,000 p.s.i. for about 1 hour to produce a unitary structure. Hot pressing produces an excellent anion exchange relationship between the end members and the intermediate member and between the platinum foils and the end members.

When the device is assembled to an external electrical circuit that applies an electrical potential thereto and its temperature is raised to about 500°–1,5000° C., anions of oxygen migrate through the intermediate member while the electrons corresponding thereto migrate through the external circuit. When the external circuit is interrupted and the electrical field is removed, the unbalanced situation existing within the device produces an electrical potential across its terminals. When the external circuit is reconnected, anions return to the original side member through the intermediate member and electrons flow through the external circuit to link up with the returning anions.

Thus the device serves as an energy storage device such as a capacitor or battery. The device is particularly useful in conjunction with fuel cells that operate at elevated temperatures where the device can be used to store energy to meet temporary demands in excess of the rated capacity of the fuel cell.

We claim:

1. A solid state energy storage device comprising a ceramic sandwich having two end members in anion exchange relationship with and separated by an intermediate member, each of said end members consisting essentially of a polycrystalline material comprising an electronically conductive structural lattice containing anions that migrate relative to said lattice, said lattice comprising ions of oxygen and ions of a metal in two valence states, said intermediate member consisting essentially of an electronically insulative structural lattice containing anions that migrate in relation to said lattice under the influence of an electric field and at a temperature of at least about 500° C., said anions of the intermediate member being of the same element as the anions of the end members.

2. The energy storage device of claim 1 in which said anions are oxygen ions.

3. The energy storage device of claim 2 in which the metal having two valence states is cerium and the molar ratio of the oxygen ions to the cerium ions is between the molar ratios at said two valence states.

4. The energy storage device of claim 3 in which the molar ratio of oxygen ions to cerium ions is about 1.90–1.95.

5. The energy storage device of claim 4 in which the intermediate member comprises a solid solution of zirconium oxide and yttrium oxide or zirconium oxide and calcium oxide.

6. The energy storage device of claim 1 in which the intermediate member comprises a solid solution of zirconium oxide and yttrium oxide or zirconium oxide and calcium oxide.